United States Patent
Cazier

(10) Patent No.: US 7,667,736 B2
(45) Date of Patent: Feb. 23, 2010

(54) OPTIMIZED STRING TABLE LOADING DURING IMAGING DEVICE INITIALIZATION

(75) Inventor: Robert P. Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 11/056,516

(22) Filed: Feb. 11, 2005

(65) Prior Publication Data

US 2006/0181613 A1    Aug. 17, 2006

(51) Int. Cl.
*H04N 5/228* (2006.01)
*H04N 5/76* (2006.01)
*H04N 5/222* (2006.01)

(52) U.S. Cl. .......... 348/222.1; 348/231.1; 348/333.02

(58) Field of Classification Search .......... 348/222.1, 348/231.1, 333.02
See application file for complete search history.

(56) References Cited

U.S. PATENT DOCUMENTS

| | | | |
|---|---|---|---|
| 2002/0030754 A1* | 3/2002 | Sugimoto | 348/333.02 |
| 2003/0174219 A1* | 9/2003 | Iijima | 348/231.99 |
| 2003/0206239 A1* | 11/2003 | Battles | 348/333.02 |
| 2005/0212915 A1* | 9/2005 | Karasaki et al. | 348/207.2 |
| 2005/0212943 A1* | 9/2005 | Karasaki et al. | 348/333.02 |

\* cited by examiner

*Primary Examiner*—James M Hannett

(57) ABSTRACT

A method for initializing an imaging device includes executing a startup procedure to enter an image capture mode without loading any string tables for a user interface, detecting a need to display text in the user interface, and loading a string table enabling the text to be displayed when the need is detected.

20 Claims, 2 Drawing Sheets

30 — Execute a startup procedure to enter an image capture mode in an imaging device without loading any string tables for a user interface 32 — Detect a need to display text in the user interface on the imaging device 34 — Load a string table enabling the text to be displayed in the user interface after the need is detected

OPTIMIZED STRING TABLE LOADING DURING IMAGING DEVICE INITIALIZATION

BACKGROUND

Electronic imaging devices such as digital cameras are used in a wide range of applications and are steadily becoming less expensive and simpler to use. Electronic images have many advantages over film-based images that are causing the use of electronic imaging devices to rapidly increase. Electronic images may be stored indefinitely without the image degradation suffered by film-based images. Electronic imaging devices generate images that can be viewed immediately and used in a variety of ways such as printing, posting to a web page on the World Wide Web, transmitting to others by electronic mail (email) or other means, etc. They can also rapidly capture large numbers of images that can be previewed and stored or deleted as desired. As the capacity of removable solid-state memories has increased and price has gone down, typical electronic imaging devices can now capture and store hundreds of electronic images.

Electronic imaging devices typically include a processor of some type to execute programs to provide a user interface, control the functions of the device, perform image processing, etc. However, as with conventional general purpose computers, it can take an undesirable amount of time to initialize or boot the electronic imaging device. When the electronic imaging device is turned on, initialization programs are executed to test the systems in the electronic imaging device, load the user interface, configure the electronic imaging device in a default mode, etc. The delay when an electronic imaging device is initializing can be particularly troublesome because a user has often turned on the electronic imaging device in an attempt to capture an image before the scene changes. If the initialization time is too long, the user may miss the opportunity to capture the desired image.

BRIEF DESCRIPTION OF THE DRAWINGS

Illustrative embodiments are shown in the accompanying drawings as described below.

DESCRIPTION

Figure 1:
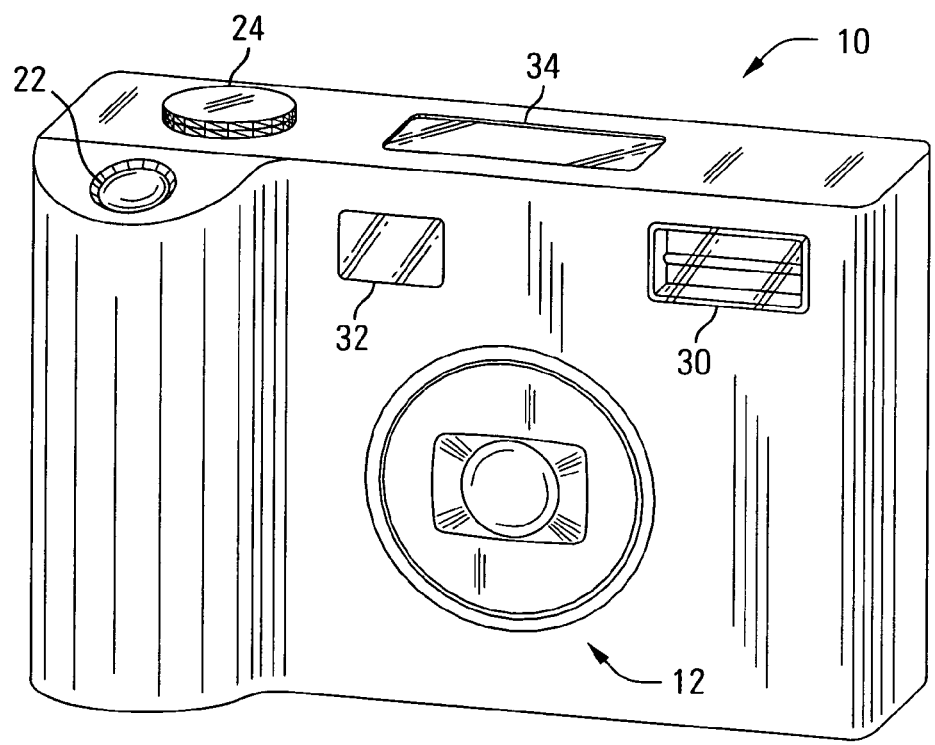
FIG. 1 is an isometric front view illustration of an exemplary imaging device which may be used to decrease chromatic aliasing in an electronic image.

The drawing and description, in general, disclose a method and apparatus for optimized loading of string tables during imaging device initialization. The method and apparatus may apply to any type of imaging device, such as a digital camera, that loads string tables during an initialization or boot process. For example, an exemplary boot process in a digital camera includes the loading of tables for various functions for image capture and processing and for the user interface. One such type of table is a string table containing text-based information, such as a localization string table or language file. The localization string table enables the digital camera to display messages in any of a number of different languages, such as English or French. Text in various languages may be combined in a single string table or may be divided into multiple string tables by language.

The term "text" is used herein to refer to data to be displayed by a user interface that is translated by entries in a string table. For example, numeric information that displays the status of an imaging device need not be translated because numbers are so universally understood, whereas a text-based message such as "Card Full" may be translated by entries in a string table into various languages such as English or French.

The terms "initialization process" and "boot process" are used herein to refer to all tasks that are performed in an imaging device after power is turned on until the imaging device is in an image capture mode in which an image may be captured by pressing the shutter release button. In an exemplary electronic imaging device such as a digital camera, the image capture mode comprises an image preview mode wherein a live view of the scene to be imaged is displayed on a display in the imaging device. The tasks involved in the initialization process may vary based on the design of the imaging device, but may include such tasks as loading computer code for a user interface, testing internal memory, configuring the imaging device according to a default mode, initiating autofocusing, etc.

The method and apparatus for optimized loading of string tables postpones loading of string tables until after the initialization process is complete and the imaging device is in the image capture mode, unless a need to display a text-based message is detected, such as an error or a connection to another electronic device. The imaging device is adapted to display numeric or graphical information in the image capture mode, such as the number of images that may be captured and stored in the remaining free space of an external memory, or the automatic exposure mode of the imaging device. The imaging device may also display a live view of the scene to be imaged in the image capture mode. The image capture mode thus provides the user with all the information needed to capture an image, without displaying text. By entering the image capture mode before loading string tables, the initialization process is faster and the imaging device appears to the user to be more responsive. The delay between turning power on until the imaging device is ready to capture an image can thus be significantly reduced. When a need to display a text-based message is detected, the string table is loaded so the message may be displayed. For example, if an error is detected such as a lack of free memory space or a focus error, the string table may be loaded to display the message "Card Full" or "Focus Error". The need to display a message may be based on a condition other than an error. For example, if a universal serial bus (USB) connection to a computer is detected, the string table may be loaded to display the message that a connection has been established. Once the string table has been loaded in an exemplary embodiment, it remains loaded and accessible until the imaging device has been turned off or until another language has been selected, at which point another string table for the new language would be loaded.

Figure 2:
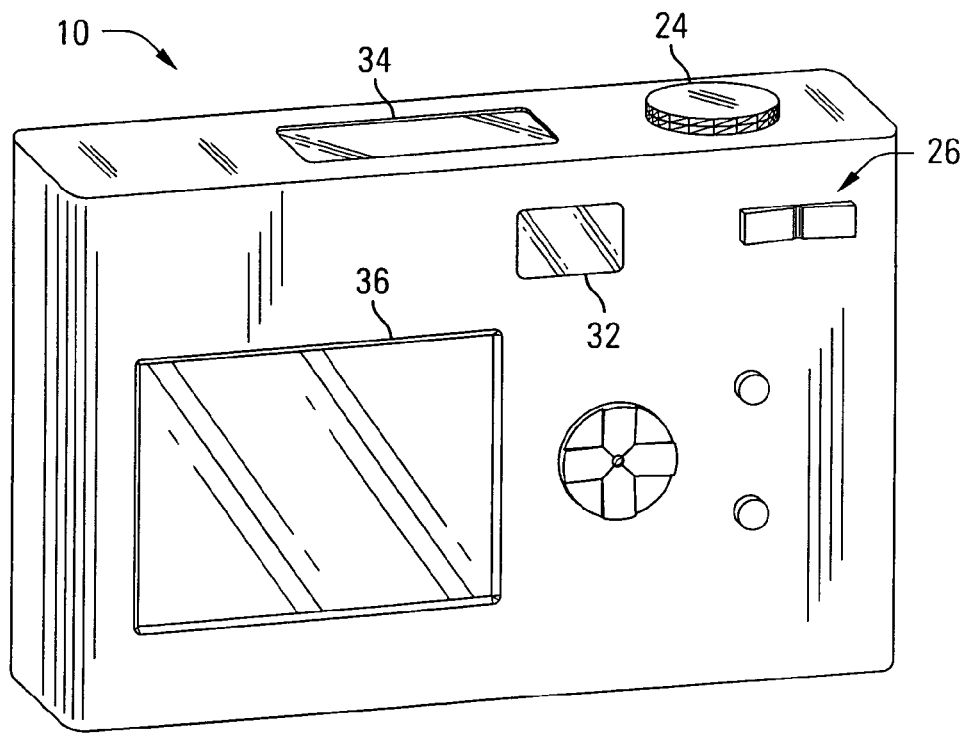
FIG. 2 is an isometric rear view illustration of the exemplary imaging device of FIG. 1.
Figure 3:
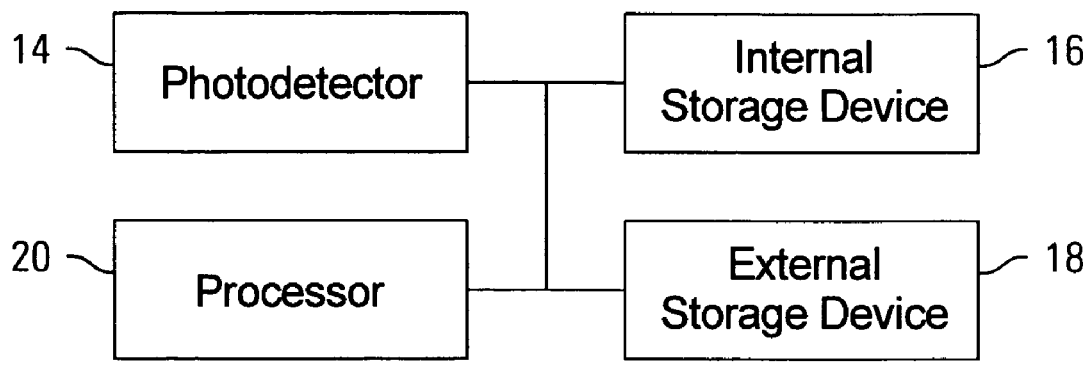
FIG. 3 is a block diagram of the exemplary imaging device of FIG. 1.

An exemplary digital camera employing the method and apparatus for optimized loading of string tables is illustrated in FIGS. 1-3. The exemplary digital camera 10 includes a lens assembly 12 and a photodetector 14 such as a charge-coupled device (CCD) or a complementary metal-oxide semiconductor (CMOS) sensor, etc. The digital camera 10 includes storage devices such as an internal memory 16 to store string tables and program code for controlling the digital camera, and an external, removable memory card 18 to store images captured by the photodetector 14. A processor 20 is provided to control the digital camera 10, including operating a user interface to process control input from the user and to display images and camera status, etc. The processor 20 in the exemplary digital camera 10 also processes and formats the captured images. The processor 20 may comprise any suitable device for controlling the digital camera 10. For example, the processor 20 may comprise a general purpose microprocessor or a hard-coded device such as an application specific integrated circuit (ASIC). The digital camera 10 may include control buttons such as a shutter release button 22, a power/mode button 24 for turning on the digital camera 10 and for selecting a desired mode of operation, and other buttons as desired (e.g., 26, etc). The digital camera 10 may also include a flash 30, a viewfinder 32 and display devices 34 and 36. The display devices may display images and other information using graphics, numbers and text. For example, in the image capture mode, the exemplary digital camera 10 displays a continuously updated, live image of the scene to be captured on a display panel 36 on the back of the digital camera 10. The number of images that can be captured and stored in the external memory card 18 may be displayed on either or both of the exemplary display devices 34 and 36, as well as graphics indicating the flash mode, the automatic exposure mode, etc.

Figure 4:
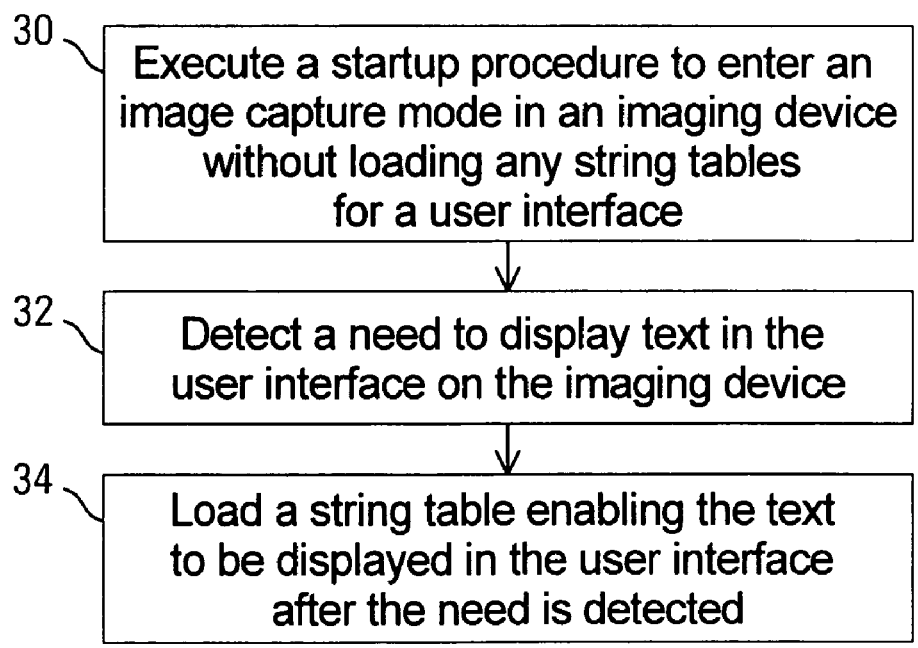
FIG. 4 is a flow chart of an exemplary operation for initializing an imaging device.

An exemplary operation for initializing an imaging device, whereby loading of string tables is optimized, is illustrated in FIG. 4. An initialization procedure is executed 30 to enter the image capture mode in the imaging device without loading any string tables for a user interface. The imaging device is able to capture an image at this point when the shutter release button is pressed (although some operations such as focusing and exposure control may still need to be performed). Numbers and graphics are displayed as needed on a display in the imaging device to provide information about the state of the imaging device to the user. A continuously updated live view of the scene to be captured may also be displayed on a display in the imaging device. If and when a need to display text in the user interface is detected 32, a string table is loaded 34 enabling the imaging device to display the text.

By delaying the loading of string tables until after the imaging device has entered an image capture mode, the initialization time is reduced in at least two ways. First, the time needed to retrieve the string tables from a memory is avoided. For example, in the exemplary digital camera, string tables fill a large amount of memory in proportion to the overall camera software or firmware size, so delaying their retrieval shifts a relatively large portion of the data retrieval from the initialization process to a more convenient time. Second, string tables may need to be decompressed or otherwise decoded in the imaging device after retrieval. Delaying loading of string tables shifts the decompressing or other processing of string tables from the time-critical initialization process to a more convenient time.

In the exemplary embodiment, string tables are loaded when a need to display text is detected, such as when an error condition or a connection to an external device is detected, etc. For example, if the external memory card in the imaging device is full, the user interface in the imaging device would load and decompress the appropriate string table to display a message such as "Card Full". The increased delay in displaying the first error message is not as critical as a delay in initializing the imaging device, because the imaging device typically cannot capture an image anyway if an error exists. Note that if a need to display text is detected during the initialization process, the imaging device will load the appropriate string table to display a text-based error message.

The startup of an exemplary imaging device, when booted without errors, would include powering on and booting to the image capture mode. The imaging device would subsequently automatically load a string table when needed. Once loaded, the string tables would remain loaded and accessible until the power is turned off or the language is changed, at which point another string table would be loaded for the new language.

The startup of an exemplary imaging device, when booted with errors, would include powering on, booting until the error was detected, and loading of string tables to display an error message. Again, once the string tables are loaded, they would remain loaded and accessible until the power is turned off or the language is changed, at which point another string table would be loaded for the new language.

As mentioned above, the method and apparatus for optimized loading of string tables during imaging device initialization may be of benefit in any imaging device that loads string tables, including film-based cameras or video cameras. The initialization or boot process may vary in these devices, and may include any tasks needed to place the imaging device in an image capture mode in which images may be captured or recorded.

The method and apparatus for optimized loading of string tables during imaging device initialization may be embodied in software or firmware or may be hard-coded in an electronic circuit. For example, if the processor 20 in an imaging device is a general purpose processor, the method for optimized loading of string tables during imaging device initialization may comprise initialization program code and string tables stored in an internal flash memory accessed over an input/output (I/O) bus. If the processor 20 is an ASIC, the initialization program code may be hard-coded in the design of the ASIC, and the string tables may either be stored in an internal memory or hard-coded in the design of the ASIC. Note that the location of the string tables in the imaging device and the associated storage device may vary and is not limited to the exemplary internal memory or internal flash memory described above.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method of initializing an imaging device, comprising:
   executing a startup procedure to enter an image capture mode in said imaging device without loading any string tables for a user interface;
   detecting a need to display text in said user interface on said imaging device; and
   loading a string table enabling said text to be displayed in said user interface when said need is detected, while maintaining said imaging device in said image capture mode.

2. The method of claim 1, wherein said image capture mode comprises a mode in which an image may be captured by pressing a shutter release button on said imaging device.

3. The method of claim 1, wherein said user interface displays information on at least one display panel on said imaging device.

4. The method of claim 1, wherein said imaging device displays a live preview of a scene to be imaged on a display on said imaging device when said imaging device is in said image capture mode.

5. The method of claim 1, said executing said startup procedure to enter said image capture mode further comprising displaying graphics.

6. The method of claim 1, said executing said startup procedure to enter said image capture mode further comprising displaying numerical information.

7. The method of claim 1, said detecting said need to display text comprises detecting an error condition in said imaging device.

8. The method of claim 7, said error condition comprising a lack of free storage space to capture images.

9. The method of claim 1, said loading said string table comprising retrieving said string table from an internal memory in said imaging device.

10. The method of claim 1, said loading said string table comprising decompressing said string table.

11. The method of claim 1, said string table comprising at least one language file comprising text to be displayed in a language corresponding to said language file.

12. An apparatus for initializing an imaging device, comprising:
   a. at least one computer readable medium; and
   b. computer readable program code stored on said at least one computer readable medium, said computer readable program code comprising:
      i. code for initiating an image capture mode enabling an image to be captured by said imaging device; and
      ii. code for loading at least one string table for a user interface in said imaging device while said imaging device is in said image capture mode, wherein said code for loading said at least one string table prevents loading of any string tables in said imaging device until after said code for initiating said image capture mode has been executed.

13. The apparatus of claim 12, wherein said code for loading said at least one string table further comprises code for loading said at least one string table when a need to display text is detected.

14. The apparatus of claim 13, wherein said need comprises an error state.

15. The apparatus of claim 12, wherein said code for loading said at least one string table comprises code for retrieving a string table from an internal memory in said imaging device.

16. The apparatus of claim 12, wherein said code for loading said at least one string table comprises code for decompressing a string table.

17. The apparatus of claim 12, wherein said code for initiating said image capture mode comprises displaying a live view of a scene to be imaged on a display device in said imaging device.

18. The apparatus of claim 12, wherein said code for initiating said image capture mode comprises displaying numerical information on a display device in said imaging device.

19. An apparatus for initializing an imaging device, comprising:
   means for booting said imaging device to an image capture mode enabling an image to be captured by said imaging device; and
   means for loading at least one string table for a user interface in said imaging device while said imaging device is in said image capture mode, wherein said means for loading string tables does not load string tables until said imaging device has entered said image capture mode.

20. The apparatus of claim 19, wherein said means for loading said string tables loads said at least one string table when an error is detected in said imaging device so that an error message can be displayed in said imaging device.

* * * * *